United States Patent
Park et al.

(10) Patent No.: US 9,464,838 B2
(45) Date of Patent: Oct. 11, 2016

(54) METHOD OF CONTROLLING HEAT PUMP SYSTEM OF ELECTRIC VEHICLE

(71) Applicant: Hyundai Motor Company, Seoul (KR)

(72) Inventors: Jae Hyun Park, Hwaseong-si (KR);
Sang Hun Kim, Hwaseong-si (KR);
Dong Hyun Kong, Hwaseong-si (KR);
Chang Won Lee, Hwaseong-si (KR);
Joon Hyung Park, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 465 days.

(21) Appl. No.: 14/044,564

(22) Filed: Oct. 2, 2013

(65) Prior Publication Data
US 2014/0230469 A1    Aug. 21, 2014

(30) Foreign Application Priority Data
Feb. 18, 2013   (KR) ................. 10-2013-0016880

(51) Int. Cl.
*F25B 49/02* (2006.01)
*B60H 1/00* (2006.01)
*B60H 1/32* (2006.01)

(52) U.S. Cl.
CPC ......... *F25B 49/022* (2013.01); *B60H 1/00392* (2013.01); *B60H 1/3213* (2013.01); *B60H 2001/326* (2013.01); *B60H 2001/3272* (2013.01); *F25B 2400/0409* (2013.01); *F25B 2400/0411* (2013.01); *F25B 2600/111* (2013.01); *F25B 2700/2106* (2013.01)

(58) Field of Classification Search
CPC .................. F25B 49/02; F25B 49/022; F25B 2400/1409; F25B 2600/111; F25B 2700/2106; B60H 1/00392; B60H 1/3213; B60H 2001/326; B60H 2001/3272
See application file for complete search history.

(56) References Cited

U.S. PATENT DOCUMENTS

2013/0025312 A1*   1/2013   Hayashi ............... B60H 1/3213
                                                               62/238.7

FOREIGN PATENT DOCUMENTS

| JP | 5-294138 A | 11/1993 |
|----|----|----|
| JP | 8-099526 A | 4/1996 |
| JP | 09-033115 A | 2/1997 |
| JP | 2000-291995 A | 10/2000 |
| JP | 2003-039942 A | 2/2003 |
| KR | 10-2010-0092720 A | 8/2010 |

* cited by examiner

Primary Examiner — Marc Norman
(74) Attorney, Agent, or Firm — McDermott Will & Emery LLP

(57) ABSTRACT

A method of controlling a heat pump system of an electric vehicle, whereby power consumed for air conditioning is reduced during driving in a low load state in a heating mode, includes determining whether a heat dissipation amount insufficient condition of an indoor condenser is satisfied in the heat pump system of the electric vehicle. When it is determined that the heat dissipation amount insufficient condition of the indoor condenser is satisfied, measuring current revolutions per minute (rpm) of a compressor. It is determined whether the measured rpm of the compressor is greater than a minimum rpm limit of the compressor. When it is determined that the measured rpm of the compressor is greater than the minimum rpm limit of the compressor, the rpm of the compressor is reduced.

6 Claims, 4 Drawing Sheets

METHOD OF CONTROLLING HEAT PUMP SYSTEM OF ELECTRIC VEHICLE

CROSS-REFERENCE TO RELATED PATENT APPLICATION

This application claims benefit of priority to Korean Patent Application No. 10-2013-0016880, filed on Feb. 18, 2013 in the Korean Intellectual Property Office, the entire contents of which are hereby incorporated by reference.

TECHNICAL FIELD

The present inventive concept relates to a method of controlling a heat pump system of an electric vehicle, whereby the whole power consumed for air conditioning can be reduced.

BACKGROUND

In general, an air conditioning system for a vehicle includes an air conditioner module for cooling and heating the interior of the vehicle.

Such an air conditioner module is configured to cool the interior of the vehicle by performing heat exchange using an evaporator or by introducing cooling water into a heater so as to heat-exchange the cooling water when a heat-exchanging medium ejected by driving a compressor passes through a condenser, a receiver drier, an expansion valve, and the evaporator and then is again circulated in the compressor.

As the concern for energy efficiency and environmental pollution increases, the development of an electric vehicle that is driven using a fuel cell or electricity as a power source, or a hybrid vehicle that is driven using an engine and an electric battery, as a representative example of a green car that substantially replaces an internal combustion engine vehicle, is being required.

Among green cars, the electric vehicle does not use an additional heater, unlike an air conditioning system for a general vehicle, but uses a gas refrigerant at a high temperature under a high pressure as a heating medium in a heating mode. An air conditioning system applied to the electric vehicle is generally referred to as a heat pump system.

In the heat pump system, in a cooling mode in the summertime, the gas refrigerant at the high temperature under the high pressure that is compressed by the compressor, after being cooled and condensed by an outdoor heat exchanger (outdoor condenser), is introduced into the evaporator via the receiver drier and the expansion valve. A low-temperature and low-pressure refrigerant is evaporated by the evaporator through heat exchange with the outside air introduced into a heating, ventilation, and air conditioning (HVAC) module, and allows the air introduced into the HVAC module to be cooled. Air cooled in a state in which an indoor condenser is closed by an opening/closing door of the HVAC module, is supplied to the interior of the vehicle so that the indoor temperature of the vehicle can be lowered.

FIG. 1 illustrates an example of an operating state of a heat pump system of an electric vehicle according to the related art in a heating mode in the wintertime. The heat pump system includes a compressor 1, an indoor condenser 2, an indoor HVAC module 3, an opening/closing door 4, and a positive temperature coefficient (PTC) heater 5. The heat pump system also includes an evaporator 6, in which a refrigerant evaporates during a cooling mode in a heat pump system, a heat exchanger 7 for collecting heat generated in electronic components (e.g., motor, high voltage inverter, etc.) and transferring it to a refrigerant in a heat pump, and a coolant flow 8 for cooling off electronic components (e.g., motor, high voltage inverter, etc.).

In the heating mode in the wintertime, a high-temperature and high-pressure gas refrigerant that is compressed by the compressor 1, moves to the indoor condenser 2 (not an outdoor condenser) via a valve and is heat-exchanged with the outside air absorbed into the indoor HVAC module 3. The outside air that is heat-exchanged in a state in which the indoor condenser 2 is opened by the opening/closing door 4 of the HVAC module 3, passes through the positive temperature coefficient (PTC) heater 5 and is introduced into the interior of the vehicle so that the indoor temperature of the vehicle is risen.

The high-temperature and high-pressure gas refrigerant that is introduced into the indoor condenser 2, is condensed through heat exchange with the absorbed outside air and is again ejected as a liquid refrigerant.

However, in a change of season and in inside air modes, which are low heating load conditions in the heating mode, when, for example, the temperature is moved from a highest temperature to a cooling temperature in the heating mode (when the opening/closing door 4 is moved to a position indicated by a dotted line of FIG. 1), the air flow of the outside air that passes through the indoor condenser 2, is reduced, and the amount of heat exchange with the high-temperature and high-pressure refrigerant introduced into the indoor condenser 2 is reduced. Thus, the inlet temperature of the indoor condenser 2 rises, and the amount of heat dissipation of the indoor condenser 2 is reduced.

Thus, since the pressure of the refrigerant discharged from the indoor condenser 2 increases, power consumed by the compressor 1 increases, and the whole power consumed for air conditioning increases.

SUMMARY

The present inventive concept provides a method of controlling a heat pump system of an electric vehicle. According to the method, in the heat pump system of the electric vehicle, in a low load state in a heating mode, such as a change of season, when revolutions per minute (rpm) of a compressor can be reduced, the rpm of the compressor is reduced while keeping an indoor supply heat quantity. When the rpm of the compressor cannot be additionally reduced, an opening/closing door of an HVAC module is moved to the highest temperature or a refrigerant is bypassed by an outdoor unit. Thus, the capacity of the heat pump system can be reduced and power consumption thereof can be reduced.

An aspect of the present inventive concept relates to a method of controlling a heat pump system of an electric vehicle, whereby power consumed for air conditioning is reduced during driving in a low load state in a heating mode. The method includes determining whether a heat dissipation amount insufficient condition of an indoor condenser is satisfied in the heat pump system of the electric vehicle. When it is determined that the heat dissipation amount insufficient condition of the indoor condenser is satisfied, current revolutions per minute (rpm) of a compressor is measured. It is determined whether the measured rpm of the compressor is greater than a minimum rpm limit of the compressor. When it is determined that the measured rpm of the compressor is greater than the minimum rpm limit of the compressor, the rpm of the compressor is reduced.

The heat dissipation amount insufficient condition may be a first heat dissipation amount insufficient condition that satisfies both an indoor condenser heat dissipation disadvantageous condition and a determination condition using a refrigerant pressure sensor value gradient. The indoor condenser heat dissipation disadvantageous condition may be one selected from the group consisting of an inside air mode, individual air conditioning, an operation of an opening/closing door of a heating, ventilation, and air conditioning (HVAC) module, and a reduction in air flow manual. The determination condition using the refrigerant pressure sensor value gradient may be whether the refrigerant pressure sensor value gradient is greater than a setting value.

The heat dissipation amount insufficient condition may be a second heat dissipation amount insufficient condition that satisfies both whether a refrigerant pressure sensor value is greater than a refrigerant pressure sensor reference value and whether a refrigerant pressure sensor value gradient is greater than a setting value.

The reducing of the rpm of the compressor may include increasing ejection air flow that passes through the indoor condenser and lowering a target ejection temperature.

The method may further include reducing, when it is determined the measured rpm of the compressor is less than or equal to the minimum rpm limit, a heating capacity of the heat pump system or performing a heat storage in an interior of the electric vehicle so that an increase in pressure of the heat pump system is prevented and power consumption of the heat pump system is reduced.

The reducing of the heating capacity of the heat pump system may include reducing the heating capacity of the heat pump system by bypassing a refrigerant using an outdoor unit.

The performing of the heat storage in the interior of the electric vehicle may include moving an opening/closing door of an HVAC module for temperature control in a cooling or heating mode to a highest temperature so as to rise an indoor temperature.

BRIEF DESCRIPTION OF THE DRAWINGS

The above and other features and advantages of the present inventive concept will become more apparent by describing in detail exemplary embodiments thereof with reference to the attached drawings.

DETAILED DESCRIPTION

Figure 1:
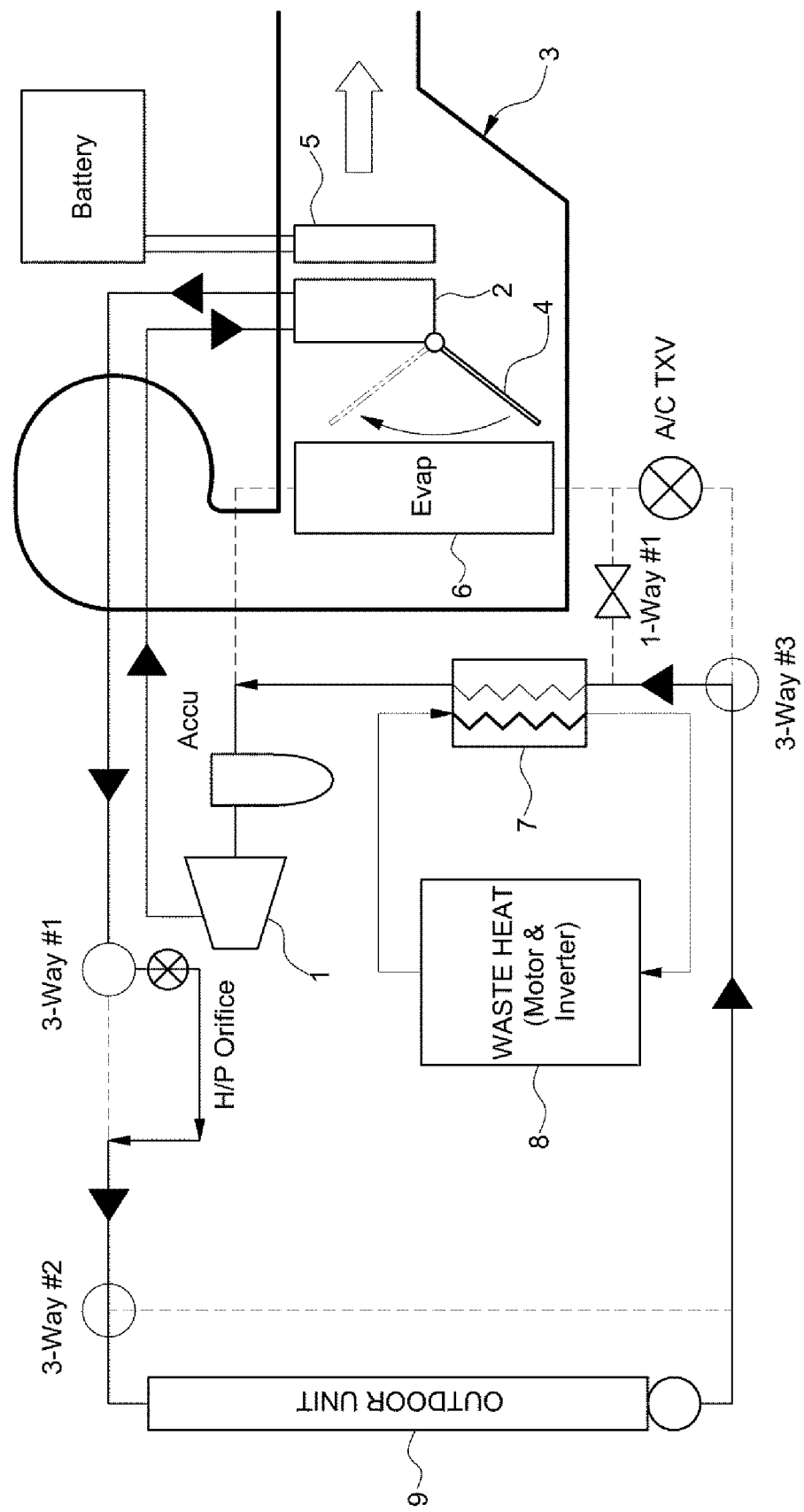
FIG. 1 illustrates an operating state of a heat pump system of an electric vehicle in a heating mode according to the related Art.

The foregoing and other features of the inventive concept will be apparent from a more particular description of embodiments of the inventive concept, as illustrated in the accompanying drawings in which like reference characters may refer to the same or similar parts throughout the different views. The drawings are not necessarily to scale, emphasis instead being placed upon illustrating the principles of the embodiments of the inventive concept.

Figure 2:
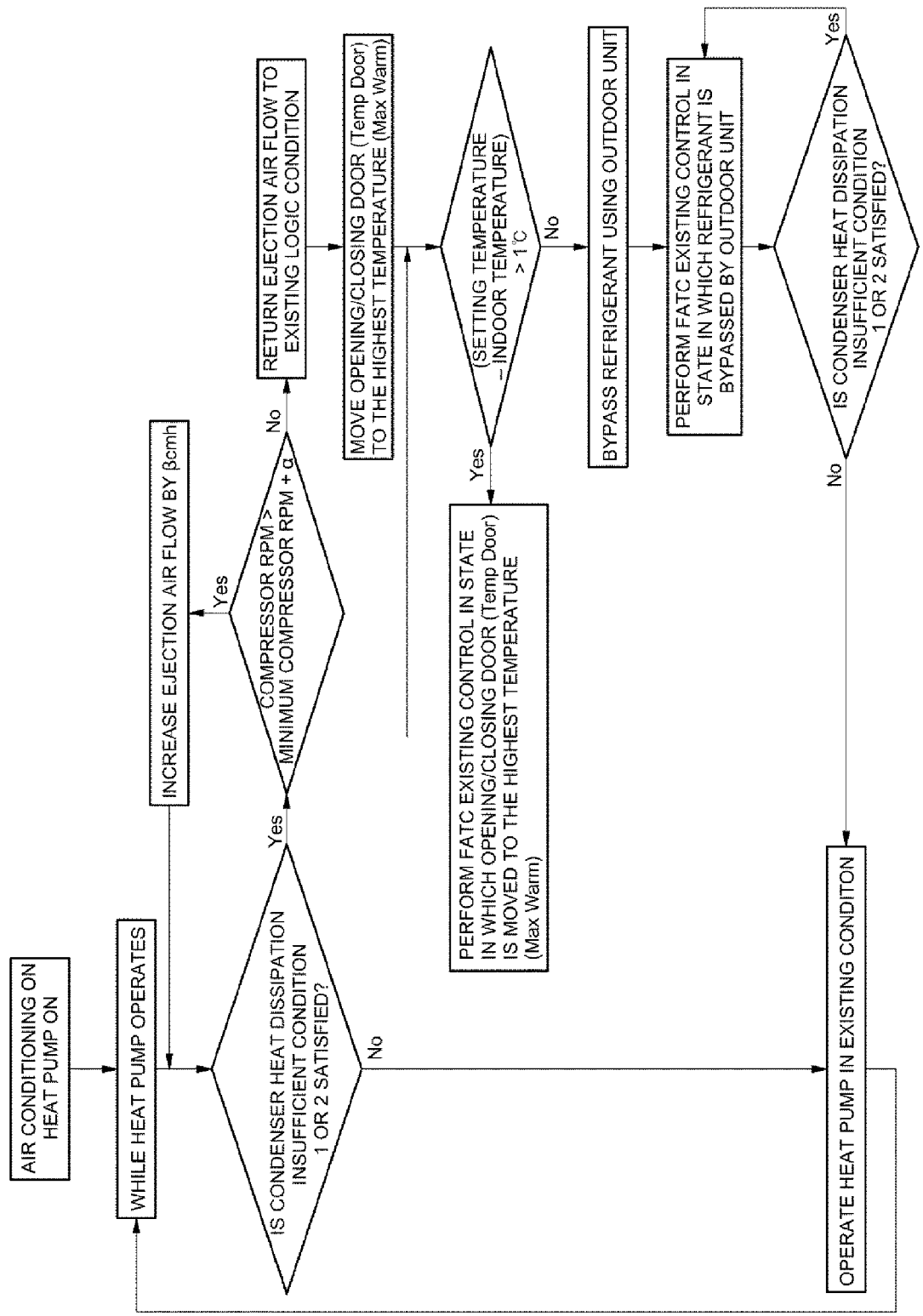
FIG. 2 is a flowchart illustrating a method of controlling a heat pump system of an electric vehicle according to an embodiment of the present inventive concept.
Figure 3:
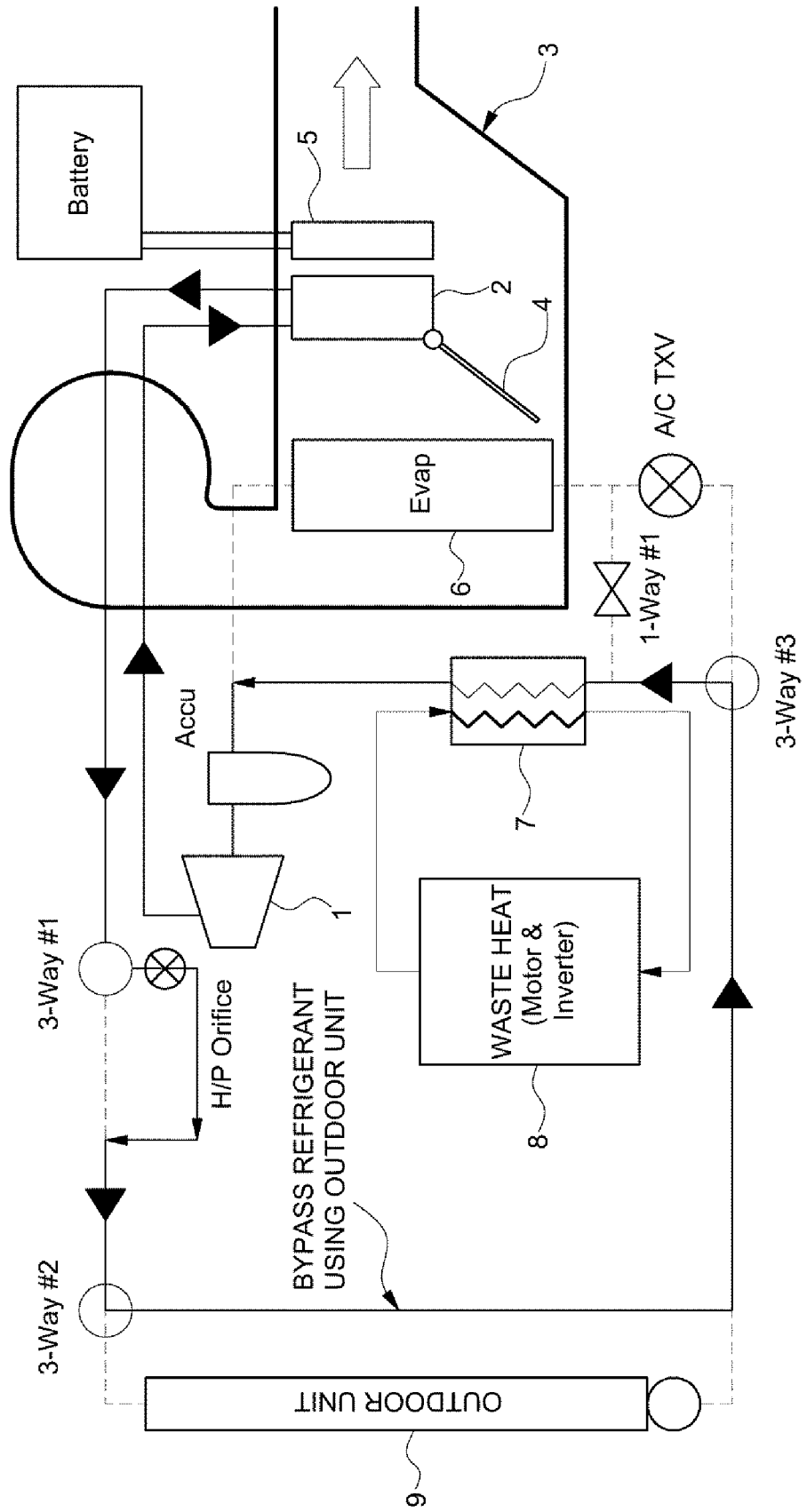
FIG. 3 illustrates an operating state of a heat pump system of an electric vehicle in a heating mode according to an embodiment of the present inventive concept.
Figure 4:
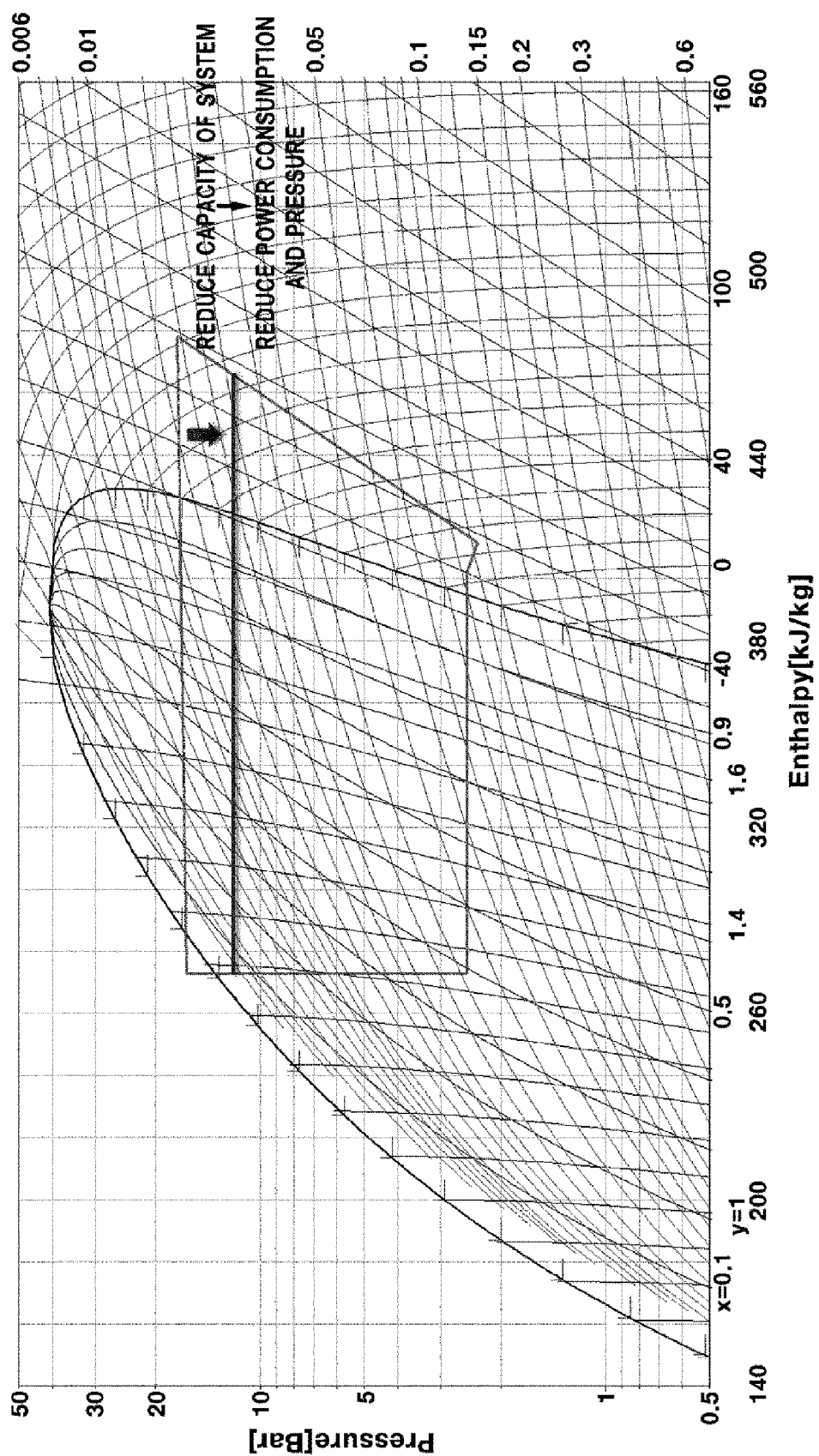
FIG. 4 is a graph showing pressure versus enthalpy (total heat) of an outlet of a heating, ventilation, and air conditioning (HVAC) module of FIG. 3.

FIG. 2 is a flowchart illustrating a method of controlling a heat pump system of an electric vehicle according to an embodiment of the present inventive concept. FIG. 3 illustrates an operating state of a heat pump system of an electric vehicle in a heating mode according to an embodiment of the present inventive concept. FIG. 4 is a graph showing pressure versus enthalpy (total heat) of an outlet of a heating, ventilation, and air conditioning (HVAC) module of FIG. 3. The references numbers in FIG. 3 refer to the same or similar parts in FIG. 1 and therefore detailed descriptions thereof will be omitted.

The present inventive concept relates to a method of controlling a heat pump system of an electric vehicle, whereby the whole power consumed for air conditioning can be prevented from increasing due to a low load state in a heating mode.

A method of controlling a heat pump system of an electric vehicle according to an embodiment of the present inventive concept will be described as below.

According to a method of controlling the heat pump system of the electric vehicle according to an embodiment of the present inventive concept, for example, it may be determined whether the amount of heat dissipation of an indoor condenser is insufficient during driving in a low load state in a heating mode.

In order to determine whether the amount of heat dissipation of the indoor condenser is insufficient, it may be determined whether a heat dissipation amount insufficient condition 1 or 2 is satisfied.

The heat dissipation amount insufficient condition 1 may be conditions disadvantageous to condenser heat dissipation, including one selected from an inside air mode, individual air conditioning, an operation of an HVAC opening/closing door 4 (see FIG. 1, operation to lower the temperature in a heating mode), and a reduction in air flow manual, and may be when a current refrigerant pressure sensor value (APT—Air-Conditioner Pressure Transducer—value) gradient is greater than β psi/min. It may be determined whether the heat dissipation amount insufficient condition 1 is satisfied.

The heat dissipation amount insufficient condition 1 may be expressed as the following Equation:

$$\text{condenser heat dissipation disadvantageous conditions (inside air mode, individual air conditioning, an operation of the HVAC opening/closing door 4, and a reduction in air flow manual)} \quad \text{AND} \qquad 1)$$

$$\text{APT value gradient} > \beta \text{ psi/min} \qquad 2)$$

For example, it may be determined whether the inside air mode is established and whether the refrigerant pressure sensor value (APT value) gradient is greater than β psi/min.

Air flow manual is to manually adjust the air flow of air ejected from an HVAC module 3 indoors, and a reduction in air flow manual may lower the ejection air flow.

The heat dissipation amount insufficient condition 2 may be when a current refrigerant pressure sensor value (APT value) is greater than a reference value (APT reference) and when the current refrigerating pressure sensor value (APT value) gradient is greater than β psi/min. It may be determined whether the heat dissipation amount insufficient condition 2 is satisfied.

The heat dissipation amount insufficient condition 2 may be expressed as the following Equation:

$$1\text{APT reference} > \text{APT reference AND} \qquad 1)$$

$$2\text{APT value gradient} > \beta \text{ psi/min} \qquad 2)$$

When the heat dissipation amount insufficient condition 1 or 2 is satisfied, it may be determined that the heat dissipation amount of the indoor condenser 2 is insufficient.

Next, an operating condition of an electric motor-operated compressor 1 may be determined.

The operating condition of the electric motor-operated compressor 1 may be classified into a heat pump control mode 1 and a heat pump control mode 2 depending on whether current revolutions per minute (rpm) of the compressor 1 can be reduced by receiving feedback of the current rpm and comparing the current rpm of the compressor 1 with a minimum rpm of the compressor 1.

In the heat pump control mode 1, when an rpm of the compressor 1 is greater than (minimum compressor rpm+α) (i.e., when comp rmp>min comp rpm+α), while an indoor supply heat quantity is kept, through an additional reduction in compressor rpm, an increase in power consumption of the compressor 1 and an increase in the whole power consumed for air conditioning can be prevented.

In other words, like in the heat pump control mode 1, when an rpm of the compressor 1 can be additionally reduced, the ejection air flow may be increased and a target ejection temperature may be lowered so that the heat dissipation amount of the indoor condenser 2 can be increased, rpm and power consumption of the compressor 1 can be reduced and furthermore, the whole power consumed for air conditioning can be reduced.

For example, when the ejection air flow is increased by y cubic meter per hour (cmh) and the target ejection temperature is lowered by δ° C., an ejection temperature change value may be determined using the following Equation so as to prevent the occurrence of a problem related to indoor temperature control:

Air flow (previous)×(ejection temperature (previous)−indoor condenser inlet temperature (previous))=air flow (after increase)×(ejection temperature (after increase)−condenser inlet temperature (after increase)).

Here, "ejection temperature" refers to "discharging air temperature", i.e., the temperature of the air supplied into the interior, whereas "condenser inlet temperature" refers to the temperature of a refrigerant at the inlet of interior condenser.

After the heat pump system is controlled in the heat pump control mode 1, when a heat dissipation amount insufficient condition of an indoor condenser 2 is released, the heat pump system may be returned to the previous air flow control.

In the heat pump control mode 2, when an rpm of the compressor 1 is less than or equal to (minimum compressor rpm+α) (i.e., when comp rmp≤min comp rpm+α), no further additional compressor rpm reduction can be carried out so that the capacity of the heat pump system can be reduced and an increase in pressure of the heat pump system can be prevented.

When no additional reduction in compressor rpm can be carried out, the ejection air flow may be returned to an existing logic condition, and the opening/closing door 4 of the HVAC module 3 may be moved to the highest temperature (Max Warm) so as to rise the indoor temperature of the vehicle.

In this case, when (setting temperature−indoor temperature) is less than 1° C., the opening/closing door 4 of the HVAC module 3 may be continuously maintained at the highest temperature, and when (setting temperature−indoor temperature) is greater than 1° C., the refrigerant may be bypassed by an outdoor unit 9.

That is, when the indoor temperature continuously rises in a state in which the opening/closing door 4 is maintained at the highest temperature, or when the heat dissipation amount insufficient condition of the indoor condenser 2 is satisfied, the refrigerant may be prevented from being introduced into the outdoor unit 9 so that the capacity of heating can be reduced, and the operation of the outdoor unit 9 may be stopped so that the pressure of the heat pump system can be reduced and power consumption thereof can be reduced.

Here, a method of preventing an increase in the pressure of the heat pump system by reducing the capacity of the heat pump system in the heat pump control mode 2 will be described as below.

1) The heat dissipation amount of the indoor condenser 2 may be increased by a predetermined level based on the indoor temperature so as to reduce power consumption.

2) A refrigerant circulation path may be changed to configure a refrigerant flow passage in which the capacity of the heat pump system can be reduced.

3) The HVAC module 3 may compare an indoor ejection temperature and the target ejection temperature, thereby controlling the refrigerant flow passage.

4) The indoor temperature and a target indoor temperature may be compared with each other so that the refrigerant flow passage can be controlled.

5) When the refrigerant flow passage is changed, the operation of a fan mounted on the whole outdoor unit 9 may be stopped to reduce power consumption.

Thus, according to the present inventive concept, degradation of power consumed for air conditioning that occurs in a low load state in a heating mode during the driving of the electric vehicle, a reduction in mileage can be prevented (for example, mileage for one-time charging during a change of season may be increased by 10%).

In addition, air conditioning efficiency can be improved by heat storage at the indoor temperature, and an unnecessary operation of the fan mounted on the outdoor unit 9 is prevented so that power consumption can be reduced.

As described above, the advantages of a method of controlling a heat pump system of an electric vehicle according to the present inventive concept are as follows.

Firstly, degradation of power consumed for air conditioning that occurs in a low load state in a heating mode during the driving of the electric vehicle is prevented so that a reduction in mileage can be prevented (mileage for one-time charging during a change of season is increased by 10%).

Secondly, air conditioning efficiency can be improved by heat storage at the indoor temperature, and an unnecessary operation of a fan mounted on an outdoor unit is prevented to reduce power consumption.

While the present inventive concept has been particularly shown and described with reference to exemplary embodiments thereof, it will be understood by those of ordinary skill in the art that various changes in form and details may be made therein without departing from the spirit and scope of the present inventive concept as defined by the following claims.

What is claimed is:

1. A method of controlling a heat pump system of an electric vehicle, whereby power consumed for air conditioning is reduced during driving in a low load state in a heating mode, the method comprising:
   determining whether a heat dissipation amount insufficient condition of an indoor condenser is satisfied in the heat pump system of the electric vehicle;

when it is determined that the heat dissipation amount insufficient condition of the indoor condenser is satisfied, measuring current revolutions per minute (rpm) of a compressor;

determining whether the measured rpm of the compressor is greater than a minimum rpm limit of the compressor; and when it is determined that the measured rpm of the compressor is greater than the minimum rpm limit of the compressor, reducing the rpm of the compressor, wherein the heat dissipation amount insufficient condition is a first heat dissipation amount insufficient condition that satisfies both an indoor condenser heat dissipation disadvantageous condition and a determination condition using a refrigerant pressure sensor value gradient, wherein the indoor condenser heat dissipation disadvantageous condition is one selected from the group consisting of an inside air mode, individual air conditioning, an operation of an opening/closing door of a heating, ventilation, and air conditioning (HVAC) module, and a reduction in air flow manual, and wherein the determination condition using the refrigerant pressure sensor value gradient is whether the refrigerant pressure sensor value gradient is greater than a setting value.

2. The method of claim 1, wherein the reducing of the rpm of the compressor comprises increasing ejection air flow that passes through the indoor condenser and lowering a target ejection temperature.

3. The method of claim 1, further comprising:

when it is determined that the measured rpm of the compressor is less than or equal to the minimum rpm limit, reducing a heating capacity of the heat pump system or performing a heat storage in an interior of the electric vehicle so that an increase in pressure of the heat pump system is prevented and power consumption of the heat pump system is reduced.

4. The method of claim 3, wherein the reducing of the heating capacity of the heat pump system comprises reducing the heating capacity of the heat pump system by bypassing a refrigerant using an outdoor unit.

5. The method of claim 3, wherein the performing of the heat storage in the interior of the electric vehicle comprises moving an opening/closing door of a heating, ventilation, and air conditioning (HVAC) module for temperature control in a cooling or heating mode to a highest temperature so as to rise an indoor temperature.

6. A method of controlling a heat pump system of an electric vehicle, whereby power consumed for air conditioning is reduced during driving in a low load state in a heating mode, the method comprising:

determining whether a heat dissipation amount insufficient condition of an indoor condenser is satisfied in the heat pump system of the electric vehicle;

when it is determined that the heat dissipation amount insufficient condition of the indoor condenser is satisfied, measuring current revolutions per minute (rpm) of a compressor;

determining whether the measured rpm of the compressor is greater than a minimum rpm limit of the compressor; and when it is determined that the measured rpm of the compressor is greater than the minimum rpm limit of the compressor, reducing the rpm of the compressor, wherein the heat dissipation amount insufficient condition is a second heat dissipation amount insufficient condition that satisfies both whether a refrigerant pressure sensor value is greater than a refrigerant pressure sensor reference value and whether a refrigerant pressure sensor value gradient is greater than a setting value.

\* \* \* \* \*